US012301067B2

(12) United States Patent
Takahashi et al.

(10) Patent No.: US 12,301,067 B2
(45) Date of Patent: May 13, 2025

(54) BRUSHLESS MOTOR

(71) Applicant: MABUCHI MOTOR CO., LTD., Chiba (JP)

(72) Inventors: Takuya Takahashi, Chiba (JP); Naoya Negoro, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 0 days.

(21) Appl. No.: 18/834,226

(22) PCT Filed: May 30, 2023

(86) PCT No.: PCT/JP2023/020146
§ 371 (c)(1),
(2) Date: Jul. 30, 2024

(87) PCT Pub. No.: WO2024/247120
PCT Pub. Date: Dec. 5, 2024

(65) Prior Publication Data
US 2025/0112527 A1     Apr. 3, 2025

(51) Int. Cl.
*H02K 5/22* (2006.01)
*H02K 11/215* (2016.01)
*H02K 21/22* (2006.01)

(52) U.S. Cl.
CPC .......... *H02K 11/215* (2016.01); *H02K 5/225* (2013.01); *H02K 21/22* (2013.01); *H02K 2211/03* (2013.01)

(58) Field of Classification Search
CPC ....... H02K 1/187; H02K 1/2786–2789; H02K 1/2791; H02K 1/27915; H02K 1/2792; H02K 5/22; H02K 5/225; H02K 11/20; H02K 11/21; H02K 11/215; H02K 21/22; H02K 21/222; H02K 21/225; H02K 2211/03
See application file for complete search history.

(56) References Cited

U.S. PATENT DOCUMENTS

| 5,770,902 | A |   | 6/1998 | Batten et al. | |
| 6,118,198 | A | * | 9/2000 | Hollenbeck | H02K 3/525 |
| | | | | | 310/216.082 |

(Continued)

FOREIGN PATENT DOCUMENTS

| CN | 112018966 A |   | 12/2020 | |
| CN | 114123672 A | * | 3/2022 | ........... H02K 1/2733 |

(Continued)

OTHER PUBLICATIONS

Shiraki, Machine Translation of CN114123672, Mar. 2022 (Year: 2022).*

(Continued)

*Primary Examiner* — Eric Johnson
(74) *Attorney, Agent, or Firm* — HAUPTMAN HAM, LLP

(57) ABSTRACT

A brushless motor includes: a rotor configured to rotate integrally with a shaft; a stator that is placed, facing the rotor in a radial direction, and includes a core around which a winding is wound; a board that is placed, spaced away in an axial direction from one end surface of the shaft, and extends in a direction intersecting with the axial direction; a holder that is fixed to the stator and configured to hold the board; and a connecting means configured to be electrically connected to the winding.

7 Claims, 5 Drawing Sheets

(56) References Cited

U.S. PATENT DOCUMENTS

| | | | |
|---|---|---|---|
| 2007/0001528 A1 | 1/2007 | Umegaki et al. | |
| 2012/0039729 A1 | 2/2012 | Horng et al. | |
| 2014/0339966 A1* | 11/2014 | Tomizawa | H02K 11/33 |
| | | | 310/68 D |
| 2017/0279330 A1* | 9/2017 | Willner | H02K 5/225 |
| 2018/0233989 A1 | 8/2018 | Ishida | |
| 2019/0267862 A1 | 8/2019 | Hattori et al. | |

FOREIGN PATENT DOCUMENTS

| | | | | |
|---|---|---|---|---|
| CN | 115549363 | A | * | 12/2022 |
| DE | 69630893 | T2 | | 8/2004 |
| DE | 102011111667 | A1 | | 3/2013 |
| JP | 2005261089 | A | | 9/2005 |
| JP | 2015033293 | A | | 2/2015 |
| JP | 2015095945 | A | | 5/2015 |
| JP | 5937554 | B2 | | 6/2016 |
| JP | 2018129999 | A | | 8/2018 |
| JP | 2019088073 | A | | 6/2019 |
| JP | 7074945 | B1 | | 5/2022 |
| JP | 2002252946 | A | | 9/2022 |
| WO | WO-2017071883 | A1 | * | 5/2017 ........... H02K 11/215 |
| WO | WO-2020015360 | A1 | * | 1/2020 ........... H02K 11/215 |

OTHER PUBLICATIONS

Yamaguchi, Machine Translation of CN115549363, Dec. 2022 (Year: 2022).*
Kohler, Machine Translation of WO2017071883, May 2017 (Year: 2017).*
Hu, Machine Translation of WO2020015360, Jan. 2020 (Year: 2020).*
International Search Report in PCT Application No. PCT/JP2023/020146 mailed Aug. 1, 2023, 5pp.
Written Opinion in PCT Application No. PCT/JP2023/020146 mailed Aug. 1, 2023, 10pp.
Decision to Grant a Patent in JP Application No. 2024-527670 mailed Jul. 9, 2024, 6pp.
Office Action in CN Application No. 202380019048.4 mailed Mar. 12, 2025, 13pp.
Office Action in DE Application No. 112023000393.9 dated Mar. 28, 2025, 13pp.

* cited by examiner

ONE END SIDE

THE OTHER END SIDE

BRUSHLESS MOTOR

RELATED APPLICATIONS

The present application is a National Phase of International Application No. PCT/JP2023/020146 filed May 30, 2023.

TECHNICAL FIELD

The present invention relates to a brushless motor including a board.

BACKGROUND ART

A brushless motor is provided with a board (also called an electronic board or a control board) on which electronic components such as a sensor and an electronic circuit are mounted. The board is placed in close proximity to an axial end surface of a stator or rotor with a gap therebetween. For example, Patent Literature 1 discloses a motor including a motor board that is placed, facing a resin block provided to a stator, with a gap therebetween. In this motor, a stepped pin provided to the motor board is press-fitted into a hole provided in the stator. Therefore, the position of the stator is determined in the axial direction.

CITATION LIST

Patent Literature

Patent Literature 1: Japanese Patent No. 5937554

DISCLOSURE OF THE INVENTION

Problems to be Solved by the Invention

However, in the motor of Patent Literature 1 described above, the motor board has a hole that allows a bearing holder to pass through. Therefore, since there is the hole, the area of the board is reduced, and there is a problem that the number of electronic components that can be mounted on the board is limited. Moreover, in order to secure the number of electronic components, it is necessary to increase the size of the board, which in turn may lead to an increase in the size of the motor.

A brushless motor of the present invention has been devised in view of such problems, and one of objects thereof is to mount more electronic components without increasing the size of the motor. Note that objects of the present invention are not limited to this object, but also include another object of exerting operations and effects that can be derived from configurations presented in DESCRIPTION OF PREFERRED EMBODIMENTS described below, the operations and effects being unobtainable by the known technology.

Solutions to the Problems

A brushless motor of the disclosure can be realized as aspects (application examples) disclosed below, and solves at least a part of the above problems. Any of Aspect 2 and subsequent aspects is an aspect that can be additionally selected as appropriate, and is an aspect that can be omitted. Any of Aspect 2 and the subsequent aspects does not disclose an aspect and configuration that are essential to the present invention.

Aspect 1. A brushless motor of the disclosure includes: a rotor configured to rotate integrally with a shaft; a stator that is placed, facing the rotor in a radial direction, and includes a core around which a winding is wound; a board that is placed, spaced away in an axial direction from one end surface of the shaft, and extends in a direction intersecting with the axial direction; a holder that is fixed to the stator and configured to hold the board; and a connecting means configured to electrically connect the winding and the board.

Aspect 2. In the above Aspect 1, it is preferable that the connecting means be electrically connected to the board in an outer peripheral portion of the board. Aspect 3. In the above Aspect 1 or 2, it is preferable that the connecting means be a pin fixed to the holder, and that at least a part of the pin do not overlap with the core as viewed in the axial direction.

Aspect 4. In any of the above Aspects 1 to 3, it is preferable that the brushless motor include a Hall sensor configured to detect a rotational position of the rotor. In this case, it is preferable that the holder include a mounting hole portion in which the Hall sensor is mounted.

Aspect 5. In the above Aspect 4, it is preferable that the mounting hole portion include a through-hole penetrating the holder in the axial direction, and have a stepped shape in which an opening on the rotor side is larger than an opening on the board side.

Aspect 6. In any of the above Aspects 1 to 5, it is preferable that the brushless motor include a cover mounted on the holder with the board placed between the cover and the holder.

Aspect 7. In any of the above Aspects 1 to 6, it is preferable that the brushless motor include a plate-shaped small case plate that is fixed to the stator and placed on one direction side relative to the core, the one direction being a direction of the board away from the one end surface. In this case, it is preferable that the holder include: a fixing portion fixed to the core side of the small case plate; and a boss protruding from the fixing portion toward the one direction side relative to the small case plate, and that the board extend in a direction orthogonal to the axial direction and be fixed by riveting the boss.

Aspect 8. In any of the above Aspects 1 to 7, it is preferable that the brushless motor be of an outer rotor type in which the stator is placed radially inward of the rotor.

Effects of the Invention

According to the brushless motor of the disclosure, there is no need to provide the board with a hole through which the shaft is inserted. Therefore, many electronic components can be placed without increasing the size of the board. Therefore, more electronic components can be mounted without increasing the size of the motor.

DESCRIPTION OF PREFERRED EMBODIMENTS

A brushless motor as an embodiment is described with reference to the drawings. The embodiment presented below is a mere exemplification. There is no intention to preclude various modifications and application of a technology, which are not explicitly stated in the embodiment below. The configurations of the embodiment can be modified and carried out in various manners within the scope that does not depart from the purport of the configurations. Moreover, a selection can be made from the configurations as needed, or the configurations can be combined as appropriate.

[1. Configuration]
[1-1. Entire Configuration]

Figure 1:
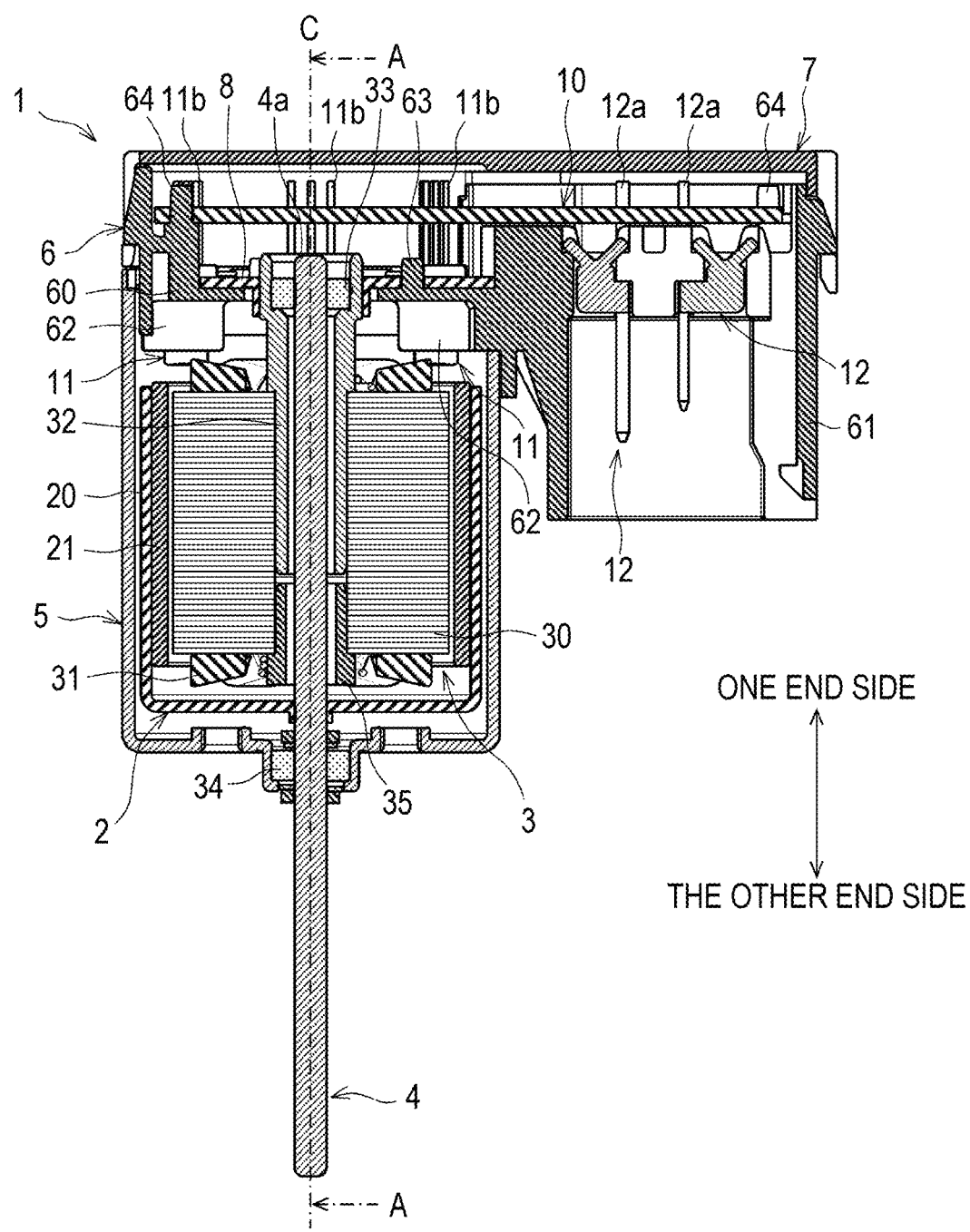
FIG. 1 is an axial cross-sectional view (a cross-sectional view on arrows B-B of FIG. 2) of a brushless motor according to an embodiment.
Figure 2:
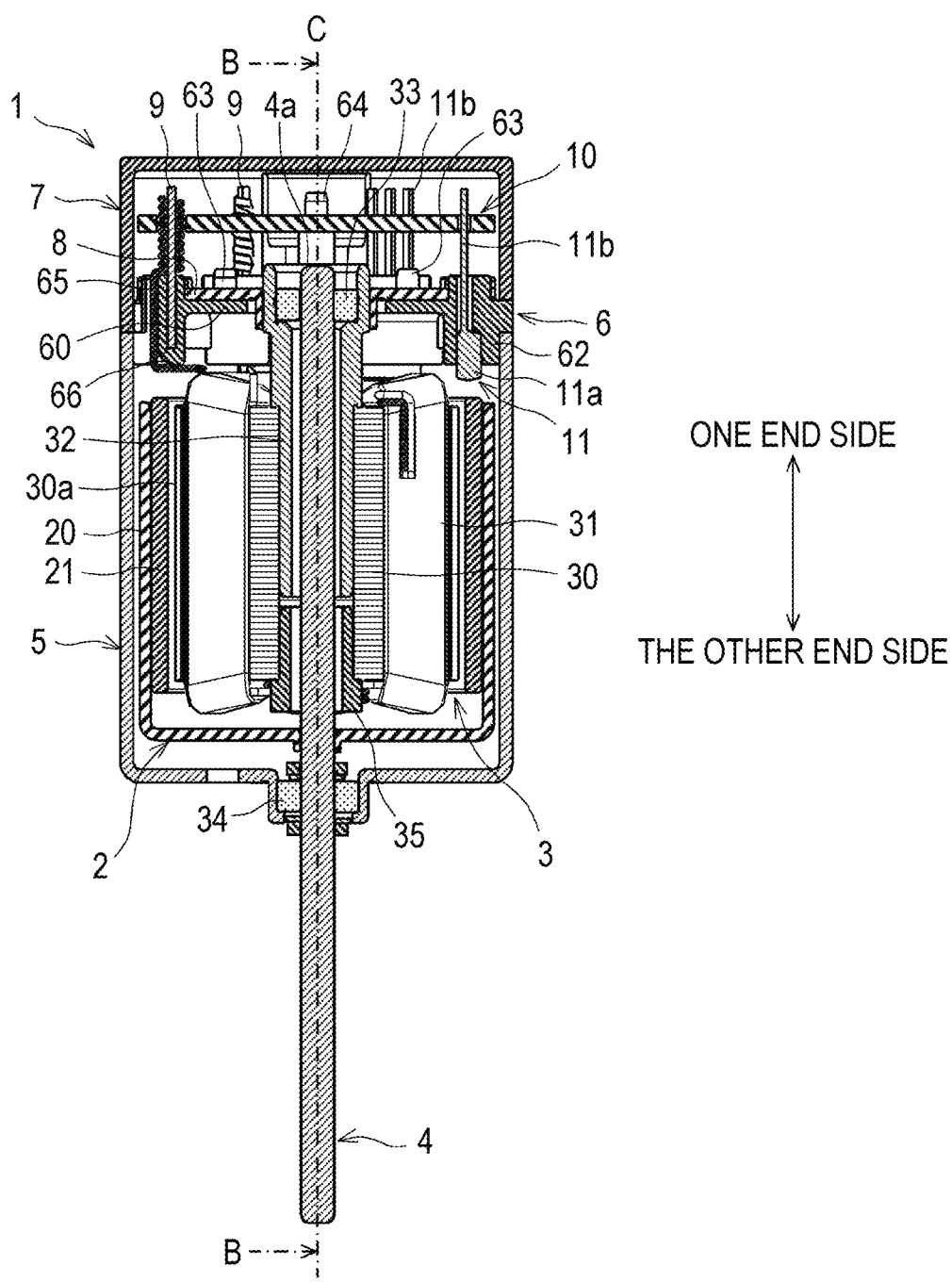
FIG. 2 is a cross-sectional view on arrows A-A of FIG. 1.

FIGS. 1 and 2 are cross-sectional views along an axial direction of a brushless motor 1 (hereinafter referred to as the "motor 1") according to the embodiment. FIG. 1 is a cross-sectional view on arrows B-B of FIG. 2, and FIG. 2 is a cross-sectional view on arrows A-A of FIG. 1. Moreover, FIG. 3 is a perspective view of the motor 1 as viewed from one end side in the axial direction, omitting a cover 7 described below from the motor 1.

Figure 3:
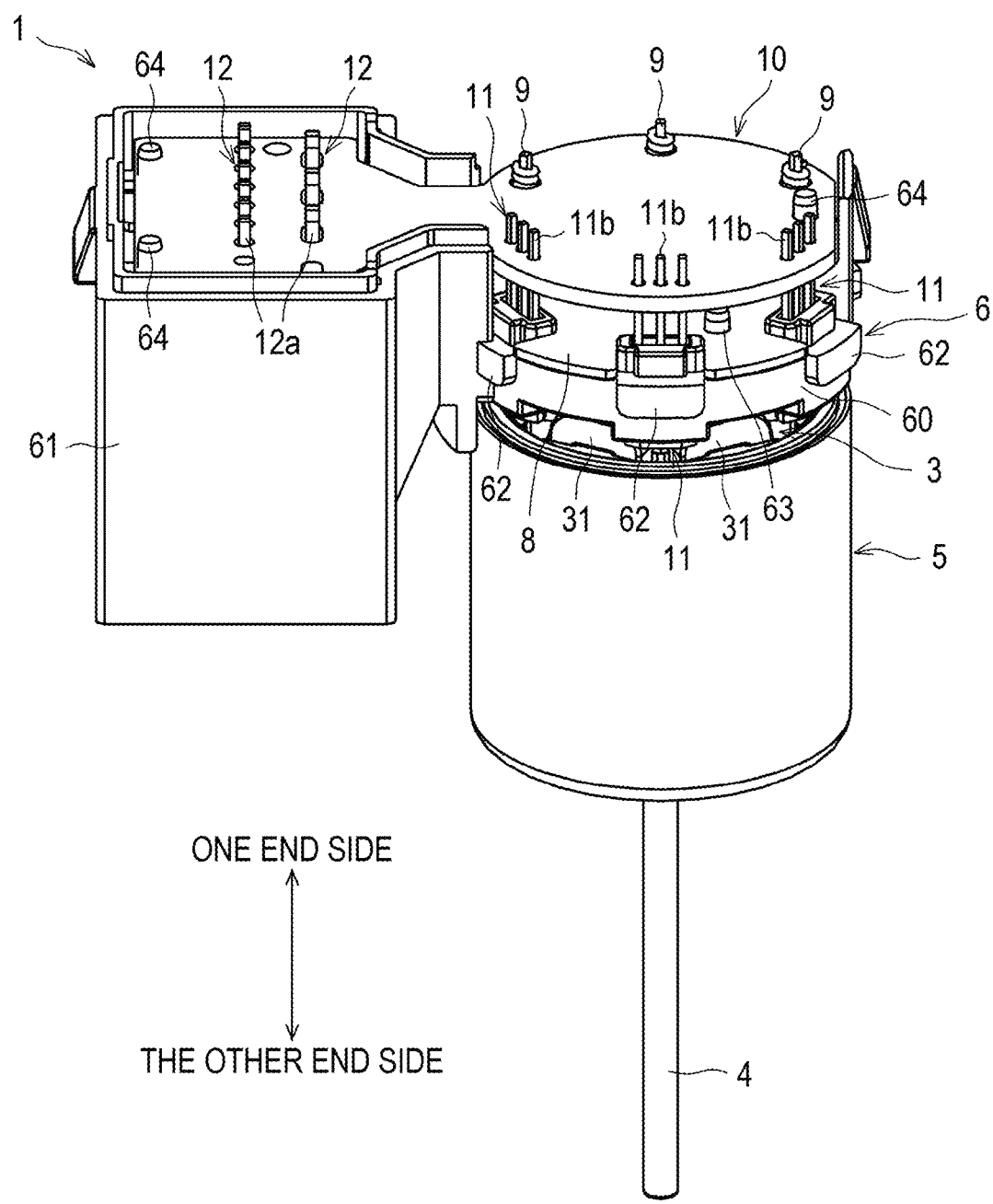
FIG. 3 is a perspective view in which a cover is omitted from the brushless motor of FIG. 1.

As illustrated in FIGS. 1 to 3, the motor 1 includes a rotor 2 that rotates integrally with a shaft 4, a stator 3 that is placed, facing the rotor 2 in a radial direction, a board 10 that extends in a direction intersecting with the axial direction, a holder 6 that holds the board 10, and connecting means 9 that electrically connect a winding 31 described below and the board 10. The motor 1 of the embodiment is an outer rotor brushless DC motor in which the stator 3 is placed radially inward of the rotor 2.

In the description of the embodiment, directions of the motor 1 (the axial direction, a circumferential direction, and the radial direction/radially) are determined relative to the shaft 4. The axial direction indicates a direction along a center line C of the shaft 4 (a longitudinal direction of the shaft 4), and the upper side (the board 10 side) in FIG. 1 is referred to as "one end side," and the opposite side is referred to as "the other end side." The circumferential direction indicates a direction around the center line C of the shaft 4 (a direction of the circumference), and the radial direction/radially indicates a direction orthogonal to both the axial direction and the circumferential direction.

As illustrated in FIGS. 1 and 2, the rotor 2 includes a bottomed cylindrical rotor yoke 20, and a magnet 21 fixed to an inner peripheral surface of the rotor yoke 20. The rotor yoke 20 has a shape that has a bottom portion located on the other end side in the axial direction and is open on the one end side in the axial direction. The center of the bottom portion of the rotor yoke 20 is provided with a through-hole in which the inserted shaft 4 is fixed. Consequently, the shaft 4 and the rotor yoke 20 (the rotor 2) rotate integrally. The magnet 21 is fixed to the inner peripheral surface of the rotor yoke 20 at a position away from the bottom portion, and rotates integrally with the rotor yoke 20.

The stator 3 is placed radially outward of the shaft 4 and radially inward of the rotor 2, and includes a stator core 30 (core) around which the winding 31 is wound. Hereafter, what is formed by winding the winding 31 is referred to as a coil, and a portion of the winding 31 that connects between a plurality of coils is referred to as a crossover wire. Moreover, the stator 3 of the embodiment includes an insulating layer (insulating coating layer) obtained by applying an insulating coating to the surface of the stator core 30. In other words, in the motor 1 of the embodiment, the insulating coating layer is provided instead of an insulator.

The stator core 30 is a laminated core obtained by laminating a plurality of steel sheets of the same shape. The shaft 4 is inserted through the center of the stator core 30 with the axial direction aligned with the steel sheet lamination direction. The stator core 30 is provided with a cylindrical portion through which the shaft 4 is inserted, a plurality of tooth portions protruding radially outward from the cylindrical portion, and blade portions that are arranged in position in the circumferential direction at an outer end portion of each of the tooth portions. The stator 3 of the embodiment includes six tooth portions (blade portions) spaced at regular intervals in the circumferential direction.

The inner diameter of the cylindrical portion of the stator core 30 is set to be greater than the outer diameter of the shaft 4. Therefore, the shaft 4 is adapted to not interfere with the stator 3. Each of the tooth portions is a portion around which the winding 31 is wound. The above-described insulating layer is provided on the surface of the tooth portions. Each of the blade portions is a flat portion facing the magnet 21 of the rotor 2, and has an arc shape as viewed in the axial direction. Surfaces, which face radially outward, of the blade portions are an outer peripheral surface 30a of the stator core 30 (hereinafter referred to as the "core outer peripheral surface 30a"). A mounting structure of the stator 3 is described below.

The shaft 4 is a rotary shaft that supports the rotor 2, and also functions as an output shaft that takes the output (mechanical energy) of the motor 1 to the outside. One end portion of the shaft 4 of the embodiment is rotatably supported by a bearing 33, and a portion on the other end side relative to the rotor yoke 20 is rotatably supported by a bearing 34. One bearing 33 is fixed to a metal holder 32 described below, and the other bearing 34 is fixed to a housing 5. Note that the housing 5 is a bottomed cylindrical component that covers the rotor 2 from the radially outer side, and is mounted on an outer peripheral surface of the rotor 2 with a gap therebetween.

The board 10 is a plate-shaped component that is placed, spaced away in the axial direction from one end surface 4a of the shaft 4, and is also called an electronic board or a control board. Note that a side in one direction (for example, the upper side in FIG. 1), which is a direction of the board 10 away from the one end surface 4a of the shaft 4, is the "one end side" of the embodiment. Unillustrated electronic components are mounted on the board 10. The board 10 is placed away from the one end surface 4a of the shaft 4 and, therefore, is not provided with a hole portion through which the shaft 4 is inserted as illustrated in FIG. 3. Hence, the area where electronic components can be placed (the area of the board) increases since there is no hole portion. The board 10 of the embodiment is placed in such a manner as to extend in the direction orthogonal to the axial direction. Consequently, the motor 1 can be configured to be compact. A mounting structure of the board 10 is described below.

As illustrated in FIGS. 1 to 3, the holder 6 is a component that is fixed to the stator 3, and is formed of, for example, resin. The holder 6 includes a fixing portion 60 that overlaps with the rotor 2 and the stator 3 as viewed in the axial direction, and a connector portion 61 provided with terminals 12. The shape of the connector portion 61 is changed according to the type of the motor 1. On the other hand, it is preferable that the shape of the fixing portion 60 be common regardless of the type of the motor 1. Detailed configurations of the holder 6 and the connecting means 9 are described below.

In addition to the above configuration, the motor 1 of the embodiment further includes a Hall sensor 11 that detects the rotational position of the rotor 2, the metal holder 32 that couples the stator 3 and the holder 6, a bushing 35 that guides the crossover wire, a small case plate 8 fixed to the stator 3, and the cover 7 mounted on the holder 6. Note that these components are not essential, and may be omitted when they can be omitted, or may be replaced with other components.

As illustrated in FIG. 2, the Hall sensor 11 includes a detecting portion 11a that detects a signal in relation to the rotational position of the rotor 2, and three terminals 11b extending linearly from the detecting portion 11a. The Hall sensor 11 is mounted in a mounting hole portion 62, which is described below, of the holder 6 in an orientation in which the detecting portion 11a faces one end surface of the rotor 2 and each of the terminals 11b penetrates the board 10. Note that the each of the terminals 11b is mounted on the board 10 by, for example, soldering. However, FIGS. 1 to 3 depict a state in which the each of the terminals 11b penetrates the board 10.

The metal holder 32 is a component that holds the bearing 33, and is fixed to an area from one end to a middle portion of an inner peripheral surface of the stator core 30. The metal holder 32 is made of, for example, resin, has a cylindrical shape that is long in the axial direction, and allows the shaft 4 to be inserted through a through-hole in the center. A center line of the metal holder 32 and the center line C of the shaft 4 coincide with each other, and a gap is formed between an inner peripheral surface of the metal holder 32 and an outer peripheral surface of the shaft 4.

The inner peripheral surface of one end portion of the metal holder 32 is provided with a stepped portion with an increased diameter. The bearing 33 on the one end side is fixed to the stepped portion. Moreover, two stepped portions are also provided on an outer peripheral surface of the metal holder 32. A first stepped portion is provided on a radially outer side of a portion in which the diameter of the inner peripheral surface of the metal holder 32 is increased. In other words, the diameter of the metal holder 32 is increased on both the inner and outer peripheral surfaces in the portion to which the bearing 33 is fixed. Therefore, the plate thickness of the metal holder 32 is secured. A second stepped portion is provided to a portion that is in contact with one end surface of the stator core 30. A portion of the metal holder 32 on the other end side relative to the second stepped portion is a portion having the smallest outer diameter, and is fitted into the cylindrical portion of the stator core 30.

The bushing 35 is a component that guides the crossover wire in such a manner that the crossover wire does not interfere with the shaft 4, and is fixed to a portion that is relatively near the other end on the inner peripheral surface of the stator core 30. The bushing 35 is made of, for example, resin, has a cylindrical shape having a shorter axial dimension than the metal holder 32, and has a through-hole in the center, through which the shaft 4 is inserted. A center line of the bushing 35 and the center line C of the shaft 4 coincide with each other, and a gap is formed between an inner peripheral surface of the bushing 35 and the outer peripheral surface of the shaft 4. Moreover, a gap is formed between the other end surface of the metal holder 32 and one end surface of the bushing 35.

The inner diameter of the bushing 35 is uniform in the axial direction. On the other hand, an outer peripheral surface of the bushing 35 is provided with a stepped portion. The stepped portion is provided to a portion that is in contact with the other end surface of the stator core 30. The bushing 35 has a smaller outer diameter on the one end side relative to the stepped portion than on the other end side, and is fitted into the cylindrical portion of the stator core 30. Note that an end surface of the stepped portion (a step surface) of the bushing 35 abuts the other end surface of the stator core 30, and therefore, even if the insulating layer is not provided on the other end surface of the stator core 30, insulation is provided by the bushing 35.

As illustrated in FIGS. 1 to 3, the small case plate 8 is a plate-shaped component, and is placed on the one end side relative to the stator core 30 in an orientation in which a plate thickness direction of the small case plate 8 coincides with the axial direction. The small case plate 8 has, for example, a shape obtained by partially cutting notches in the periphery of a disk having an outer diameter substantially equal to the outer diameter of the rotor 2. The small case plate 8 is provided in the center with a circular through-hole and a cylindrical portion standing around the through-hole. The one end portion of the metal holder 32 is press-fitted and fixed to the through-hole and the cylindrical portion of the small case plate 8. Consequently, the metal holder 32 and the small case plate 8 are integrated together.

As illustrated in FIGS. 1 and 2, the cover 7 is mounted on the holder 6 from the one end side in such a manner as to cover the board 10 held by the holder 6. In other words, the cover 7 is mounted on the holder 6 with the board 10 placed between the cover 7 and the holder 6. The cover 7 is formed of, for example, resin. In the motor 1 of the embodiment, the one end surface 4a of the shaft 4 does not penetrate the board 10. Therefore, as a matter of course, the cover 7 has no through-hole through which the shaft 4 passes.

[1-2. Configurations of Main Elements]

Figure 4:
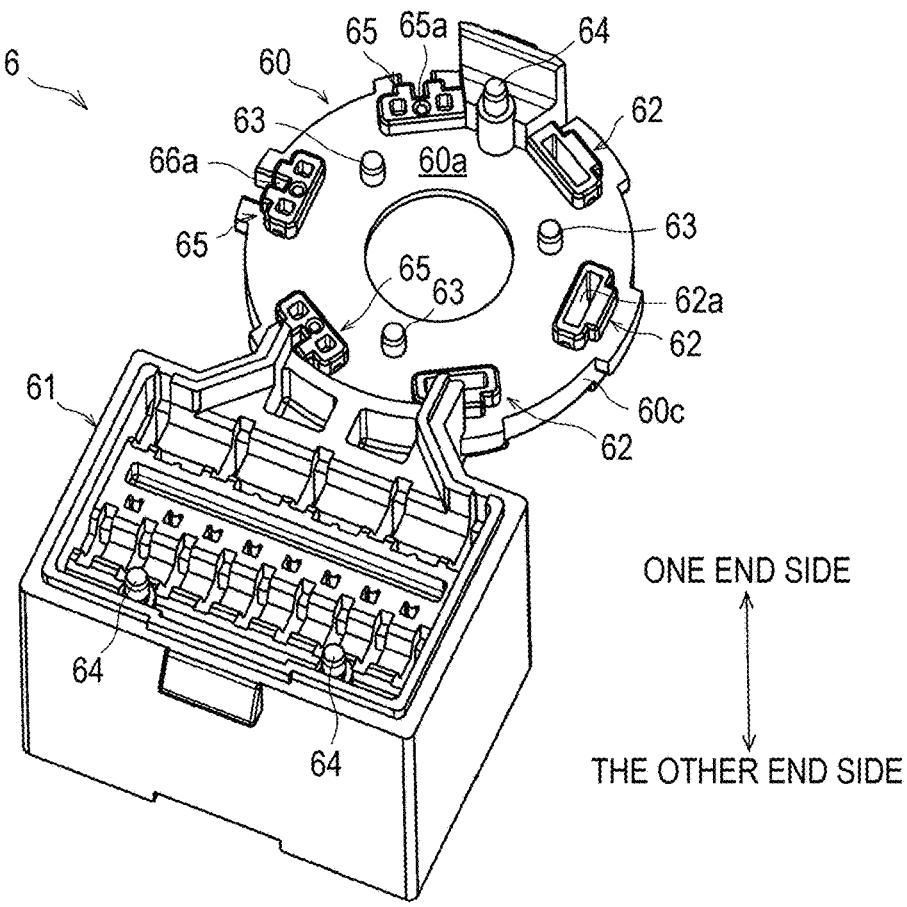
FIG. 4 is a perspective view illustrating a holder of the brushless motor of FIG. 1.
Figure 5:
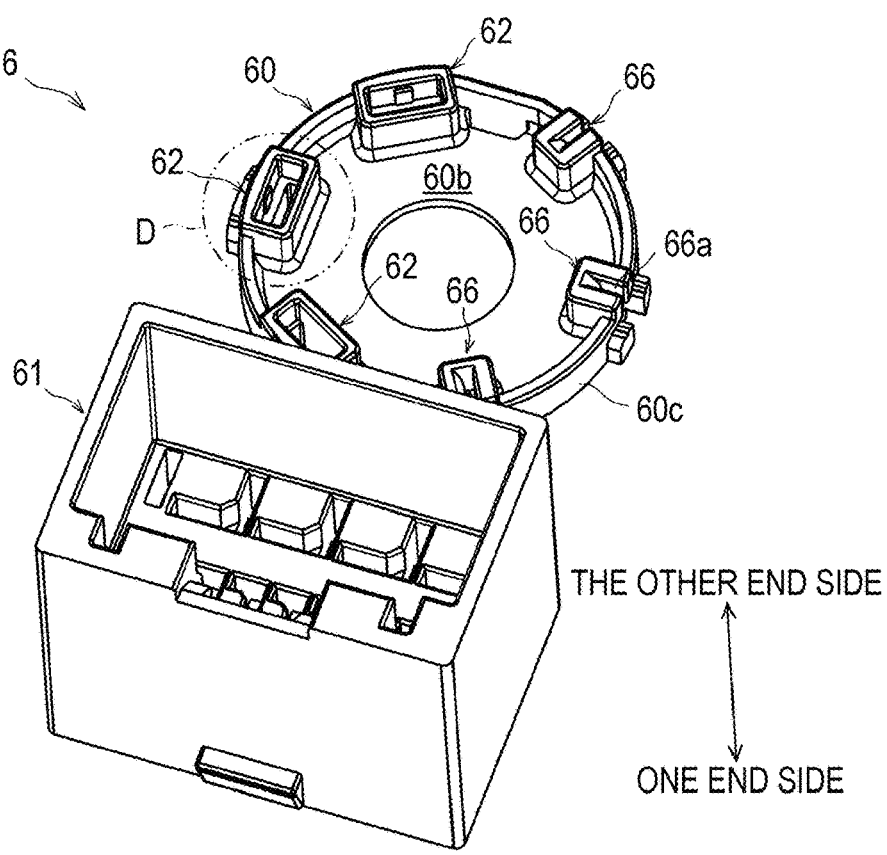
FIG. 5 is a perspective view of the holder of FIG. 4 that is inverted vertically.
Figure 6:
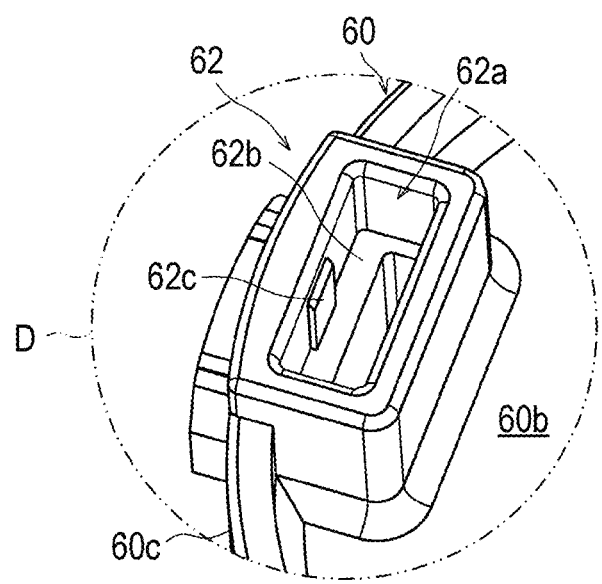
FIG. 6 is an enlarged view of a portion D of FIG. 5.

Next, the configurations of the main elements of the motor 1 including the detailed configurations of the holder 6 and the connecting means 9, the mounting structure of the board 10, and the mounting structure of the stator 3 are described. FIG. 4 is a perspective view of the holder 6 as viewed from the one end side, and FIG. 5 is a perspective view of the holder 6 as viewed from the other end side (the holder 6 of FIG. 4 that is inverted vertically). Moreover, FIG. 6 is an enlarged perspective view illustrating a portion D of FIG. 5.

As illustrated in FIGS. 4 and 5, the holder 6 includes the mounting hole portion 62, a first boss 63, a second boss 64 (boss), a pedestal portion 65, and a guide portion 66 in addition to the above-described fixing portion 60 and connector portion 61. The fixing portion 60 is a portion that fixes the holder 6 and the small case plate 8, and has a surface 60a (hereinafter referred to as the "top surface 60a") facing the one end side, the top surface 60a being fixed to a surface (a surface on the stator core 30 side), which faces the other end side, of the small case plate 8. The fixing portion 60 has a disk shape having a circular hole in the center as viewed in the axial direction, and includes a peripheral wall portion 60c standing in the axial direction from an outer edge portion of a surface 60b (hereinafter referred to as the "undersurface 60b") facing the other end side.

The connector portion 61 is provided continuously with a part of the radially outer side of the fixing portion 60. In the motor 1 of the embodiment, the connector portion 61 having a bottomed rectangular cylindrical shape (rectangular tubular shape) is exemplified. As illustrated in FIGS. 1 and 3, the connector portion 61 of the embodiment is placed adjacent to the housing 5 with a gap therebetween, and is open toward the other end side (that is, in the axial direction). In other words, the bottom portion of the connector portion 61 is placed on the one end side. For example, a notch, a slit, or a projection is formed in or on the bottom portion of the connector portion 61. Two terminals 12 are mounted inside the connector portion 61, penetrating the bottom portion in the axial direction. Note that one end 12a of each of the terminals 12 is mounted on the board 10 by, for example, soldering. However, FIGS. 1 and 3 depict a state in which the one ends 12a penetrate the board 10.

The mounting hole portion 62 is a portion in which the Hall sensor 11 is mounted, and is placed in a portion near the outer periphery of the fixing portion 60. In the motor 1 of the embodiment, three Hall sensors 11 are provided. Therefore, three mounting hole portions 62 are placed, spaced apart in the circumferential direction. The three mounting hole portions 62 are similarly configured, and each include a through-hole 62a penetrating the holder 6 in the axial direction. The Hall sensors 11 are installed in the through-holes 62a.

The mounting hole portions 62 of the embodiment have a rectangular cylindrical shape (rectangular tubular shape) protruding from the top surface 60a of the fixing portion 60 toward the one end side and also protruding from the undersurface 60b toward the other end side. The size (the area of the opening) of the through-holes 62a of the mounting hole portions 62 is not uniform in the axial direction, and the area of the opening is greater on the other end side (the rotor 2 side) than on the one end side (the board 10 side). Hence, as illustrated in FIG. 6, a step portion 62b is formed inside each of the mounting hole portions 62. In other words, the inside of the each of the mounting hole portions 62 has a stepped shape.

As illustrated in FIG. 2, the detecting portion 11a of the Hall sensor 11 is placed on the other end side relative to the step portion 62b, and the terminal 11b of the Hall sensor 11 is inserted toward the one end side relative to the step portion 62b. The detecting portion 11a protrudes slightly toward the other end side relative to the other end surface of the mounting hole portion 62 of the holder 6. Note that as illustrated in FIG. 6, a rib 62c is provided, protruding from an inner surface forming the opening on the other end side of the mounting hole portion 62. The rib 62c is in close contact with the detecting portion 11a of the Hall sensor 11 to prevent positional displacement of the detecting portion 11a.

As illustrated in FIGS. 1, 2, and 4, the first boss 63 is a portion protruding from the fixing portion 60 of the holder 6 toward the one end side, and is fitted into a hole portion penetrating the small case plate 8 and riveted to fix the holder 6 and the small case plate 8. The first boss 63 of the embodiment has a circular cylindrical shape protruding from the top surface 60a of the fixing portion 60 of the holder 6, and has a length of the protrusion that allows the first boss 63 to penetrate the small case plate 8. Note that FIGS. 1 and 2 depict a state in which the first boss 63 penetrates the small case plate 8 (a state in which riveting has not been performed). In the embodiment, as illustrated in FIG. 4, three first bosses 63 are placed, spaced at regular intervals, around the hole portion in the center of the fixing portion 60, and are fixed to the small case plate 8 in a well-balanced manner. Note that the number and placement of the first bosses 63 are not limited to the above.

As illustrated in FIGS. 1 to 4, the second boss 64 is a portion protruding from the fixing portion 60 of the holder 6 toward the one end side relative to the small case plate 8, and is fitted into a hole portion penetrating the board 10 and riveted to fix the holder 6 and the board 10. The second boss 64 of the embodiment has a circular cylindrical shape protruding from the top surface 60a of the fixing portion 60 of the holder 6, and has a length of the protrusion that allows the second boss 64 to penetrate the board 10. In other words, the length of the protrusion of the second boss 64 is greater than the length of the protrusion of the first bosses 63. Note that in the embodiment, a surface on the one end side of the connector portion 61 is also provided with similar second bosses 64 that protrude therefrom. FIGS. 1 to 3 depict a state in which the second bosses 64 penetrate the board 10 (a state in which riveting has not been performed).

In the embodiment, as illustrated in FIGS. 3 and 4, one second boss 64 is placed on the fixing portion 60 at a position farthest from the connector portion 61, and two second bosses 64 are placed on the connector portion 61 at positions farthest from the fixing portion 60, spaced apart from each other. In other words, three second bosses 64 are placed in a triangle as viewed from the one end side, and are fixed to the board 10 in a well-balanced manner. Note that the number and placement of the second bosses 64 are not limited to the above.

As illustrated in FIGS. 2 and 4, the pedestal portion 65 is a pedestal-like portion to which a pin as the connecting means 9 is fixed. The number, placement, and shape of the pedestal portions 65 are set according to the connecting means 9. The connecting means 9 are described here. In the motor 1 of the embodiment, the board 10 is placed, spaced away from the one end surface 4a of the shaft 4. Therefore, the distance between the coils and the board 10 is increased as compared with a known configuration in which the shaft penetrates the board. Hence, means for electrically connecting start wires (the winding 31) of the coils and the board 10 are provided to achieve the connections easily and reliably.

The connecting means 9 are electrically connected to the board 10 in the outer peripheral portion of the board 10. Moreover, the connecting means 9 of the embodiment are rod-like (pin-like) pins formed of a conductive material, and are electrically connected to the winding 31 as illustrated in FIGS. 2 and 3. In this manner, the winding 31 and the board 10 are electrically connected to each other via the pins 9. Hereafter, the connecting means 9 are also referred to as the "pins 9." In the motor 1 of the embodiment, "bundle pins" are provided in which the winding 31 is bundled around the pins 9. In a case of the bundle pins, both the pins 9 and the winding 31 are electrically connected to the board 10 by, for example, soldering.

In the motor 1 of the embodiment, at least a part of each of the pins 9 is placed in such a manner as not to overlap with the stator core 30 as viewed in the axial direction. Put another way, the each of the pins 9 is placed in such a manner as either to be located in its entirety radially outward of the core outer peripheral surface 30a of the stator core 30, or to partially overlap with the stator core 30 as viewed in the axial direction. In this manner, the each of the pins 9 is placed in such a manner as not to be located in its entirety radially inward of the core outer peripheral surface 30a. Therefore, the pins 9 are reliably placed in the outer peripheral portion of the board 10, and a reduction in the area of the board by the pins 9 is avoided.

The above pedestal portion 65 is placed in a portion near the outer periphery of the fixing portion 60. In the motor 1 of the embodiment, three pins 9 are provided. Therefore, three pedestal portions 65 are placed, spaced apart in the circumferential direction. The three pedestal portions 65 are similarly configured, and each include a pin hole 65a extending in the axial direction from the one end side of the holder 6. Note that the pin holes 65a are not through-holes. The each of the pins 9 is fixed to each pin hole 65a.

Note that in the holder 6 of the embodiment, the three mounting hole portions 62 and the three pedestal portions 65

(that is, six regions) are placed at positions near the outer peripheral portion of the fixing portion 60, spaced at substantially regular intervals in the circumferential direction. However, the three mounting hole portions 62 are placed within an area of 180 degrees near the outer peripheral portion of the fixing portion 60, and the three pedestal portions 65 are placed within a remaining area of 180 degrees. In this manner, the part where the Hall sensors 11 are mounted and the part where the pins 9 are mounted are different from each other, but placed in a well-balanced manner.

As illustrated in FIGS. 2 and 5, the guide portion 66 is a portion that guides the winding 31 to the board 10 via the pin 9, and is placed in a portion near the outer periphery of the fixing portion 60. In the motor 1 of the embodiment, the three pins 9 are provided. Therefore, three guide portions 66 are placed, spaced apart in the circumferential direction. The three guide portions 66 are similarly configured, and each include a slit 66a penetrating the holder 6 in the axial direction. The winding 31 is passed through the slits 66a.

The guide portions 66 of the embodiment protrude from the undersurface 60b of the fixing portion 60 toward the other end side, and have a U-shape that is open radially outward as viewed in the axial direction. In other words, notches are also cut in the peripheral wall portion 60c throughout its length in the axial direction, at the positions of the guide portions 66, to form the slits 66a. Note that as illustrated in FIG. 5, the slits 66a may be provided up to the pedestal portions 65. As illustrated in FIG. 2, the winding 31 wound around the tooth portions, together with the pins 9, is electrically connected to the board 10 in a state in which start wires of the U phase, the V phase, and the W phase are guided to the pins 9 through the slits 66a of the guide portions 66 and bundled around the pins 9.

Lastly, the mounting structure of the board 10, the mounting structure of the stator 3, and an assembly process of the motor 1 are described. The board 10 is fixed by riveting the second bosses 64 of the holder 6 as described above. Regarding the stator 3, firstly, the one end portion of the metal holder 32 is press-fitted into the small case plate 8, and the fixing portion 60 of the holder 6 is fixed to the small case plate 8 by riveting. Note that the metal holder 32 is fixed to the small case plate 8, or the holder 6 is fixed to the small case plate 8, whichever can be done first. Moreover, the pins 9 are fixed in advance to the pedestal portions 65 of the holder 6.

Next, the bearing 33 and the insulation-coated stator core 30 are fixed to the metal holder 32, and the bushing 35 is fixed to the stator core 30. After the winding 31 is then wound around the stator core 30 to form coils of the U-phase, the V-phase, and the W-phase, the start wires are guided to the pins 9 through the guide portions 66 and bundled around the pins 9. In this manner, in the embodiment, the holder 6 is fixed to the stator 3 via the small case plate 8 and the metal holder 32. The stator 3 is complete in this stage. Therefore, the above process is also referred to as a "stator process."

Regarding the rotor 2, the magnet 21 is fixed to the rotor yoke 20 and additionally, the shaft 4 is fixed thereto. The housing 5 to which the bearing 34 is fixed is mounted on them. In this stage, the board 10 has not been mounted yet. However, instead of the board 10, for example, a dummy board is mounted to enable the conduct of a test for proper motor operation.

Next, the board 10 is placed on the holder 6. At this point in time, the pins 9, the terminals 11b of the Hall sensors 11, the one ends 12a of the terminals 12, and the second bosses 64 penetrate the board 10 toward the one end side. The second bosses 64 are then riveted to fix the board 10 to the holder 6 by riveting. Furthermore, the pins 9, the terminals 11b of the Hall sensors 11, and the one ends 12a of the terminals 12 are electrically connected to the board 10 by, for example, soldering. Lastly, the cover 7 is mounted on the holder 6 to complete the motor 1.

[2. Effects]

(1) According to the above-mentioned motor 1, the board 10 is placed, spaced away in the axial direction from the one end surface 4a of the shaft 4. Therefore, there is no need to provide the board 10 with a hole through which the shaft 4 is inserted. Many electronic components can thus be placed without increasing the size of the board 10. Therefore, more electronic components can be mounted without increasing the size of the motor 1. Moreover, in the above-mentioned motor 1, the winding 31 wound around the stator 3 and the board 10 are placed, spaced apart in the axial direction. However, the winding 31 and the board 10 are electrically connected together via the connecting means 9. Therefore, they can be connected to the board 10 at their right position. Note that, as described above, the outer rotor brushless motor 1 can increase the surface area of the magnet 21 as compared to an inner rotor brushless motor of the same size. Therefore, the motor performance can be improved.

(2) In the above-mentioned motor 1, the connecting means 9 are electrically connected to the board 10 in the outer peripheral portion of the board 10. Therefore, the placement of electronic components on the board 10 is not hindered by the connecting means 9. Therefore, more electronic components can be mounted without increasing the size of the motor 1.

(3) In the above-mentioned motor 1, the connecting means 9 are configured of the pins 9 fixed to the holder 6. In this case, the pins 9 can be made thin (the outer diameter of the pins 9 can be made small) within a range that the pins 9 can tolerate the process of fixing the pins 9 to the holder 6 and within a range that the pins 9 can tolerate the process of connecting the pins 9 and the winding 31. Therefore, the winding diameter, which is the wire diameter in a state where the winding 31 is bundled around the pin 9, can be reduced, and the holes of the board 10 into each of which the pin 9 is inserted can be made small. Consequently, the area of the board can be further increased, and soldering is facilitated. Therefore, the effect of reducing the defect rate is also exerted.

Moreover, at least a part of each of the pins 9 is placed in such a manner as not to overlap with the stator core 30 as viewed in the axial direction. In this manner, the positions of the pins 9 as viewed in the axial direction are arranged in the outer peripheral portion on the board 10 to an extent that the pins 9 do not overlap partially with the stator core 30. Therefore, the degree of freedom in mounting electronic components on the board 10 can be further enhanced.

(4) In the above-mentioned motor 1, the rotor 2 and the board 10 are placed, spaced apart in the axial direction. However, the holder 6 is provided with the mounting hole portions 62, and the Hall sensors 11 are mounted in the mounting hole portions 62. Hence, the Hall sensors 11 can be placed at appropriate distances from the rotor 2 and the magnet 21 rotating integrally with the rotor 2, and detection accuracy can be secured. Moreover, the Hall sensors 11 can be easily assembled. Therefore, ease of assembly can be improved. Furthermore, the Hall sensors 11 are placed in the mounting hole portions 62. Therefore, stiffness against the installation of the Hall sensors 11 can be enhanced, and even if vibration occurs during operation of the motor 1, the vibration of the Hall sensors 11 can be prevented, which also enhances the detection accuracy.

(5) Each of the above-mentioned mounting hole portions 62 includes each of the through-holes 62a penetrating the holder 6 in the axial direction, and has the stepped shape in which the opening on the rotor 2 side is larger than the opening on the board 10 side. Hence, the Hall sensors 11 come into contact with the stepped portions (the above step portions 62b) by inserting the Hall sensors 11 into the through-holes 62a of the mounting hole portions 62 from the rotor 2 side. Therefore, the positions of the Hall sensors 11 can be easily determined in the axial direction.

(6) The above-mentioned motor 1 includes the cover 7 mounted on the holder 6 with the board 10 placed between the cover 7 and the holder 6. Therefore, the board 10 can be protected by the cover 7. Furthermore, when the cover 7 is removed, only the board 10 can be replaced. Therefore, it is possible to promote a reduction in the repair cost.

(7) The above-mentioned motor 1 includes the small case plate 8 placed on the one end side (the one direction side) relative to the stator core 30. Moreover, the above-mentioned holder 6 includes the fixing portion 60 fixed to the stator core 30 side of the small case plate 8, and the second boss 64 protruding from the fixing portion 60 toward the one end side relative to the small case plate 8. Furthermore, the above-mentioned board 10 is supported by the holder 6 in an orientation extending in the direction orthogonal to the axial direction and, therefore, can be configured to be compact. In addition, the second boss 64 is riveted to fix the board 10. In this manner, the holder 6 is fixed to the small case plate 8 and integrated with the stator 3. Therefore, the mounting stability of the holder 6 can be improved. On the other hand, the second boss 64 protruding in the axial direction toward the one end side relative to the small case plate 8 is riveted to fix the board 10. Therefore, the board 10 can be reliably fixed with an appropriate gap between the board 10 and the stator 3. Furthermore, this gap increases the distance between the board 10 and the stator 3. Therefore, the electronic components can be protected against heat generated in the stator 3. Furthermore, the small case plate 8 is provided between the board 10 and the stator 3. Therefore, the heat generated by the stator 3 can be blocked by the small case plate 8, and the electronic components can be protected further against adverse effects of the heat.

[3. Others]

The above-mentioned motor 1 is an example, and is not limited to the above-mentioned configuration. For example, the method of fixing the holder 6 and the small case plate 8 and the method of fixing the holder 6 and the board 10 may not be fixing by riveting. Moreover, instead of the direction orthogonal to the axial direction, the board 10 may extend slightly diagonally (in an intersecting direction other than the orthogonal direction). Note that the housing 5 and the cover 7 are not essential, and may be omitted or replaced with other components.

The shape of the above connector portion 61 is also an example. For example, the connector portion may be open in the direction orthogonal to the axial direction. Moreover, when instead of the terminals 12, a lead is electrically connected to the board 10, the connector portion 61 may be omitted, and the holder may be provided with a portion for bundling the lead. The above mounting structure of the Hall sensors 11 is also an example, and the shape and placement of the mounting hole portions 62 may be changed or, for example, a mounting portion separate from the holder 6 may be provided.

In the above-mentioned motor 1, the pins are adopted as the connecting means. However, the connecting means are not limited to the pins as long as they have a configuration that can electrically connect the winding 31 and the board 10. Moreover, it is preferable that the connecting means be placed in the outer peripheral portion of the board 10. However, the connecting means are placed in not limited to the outer peripheral portion as long as they are at positions that hardly hinder the placement of the electronic components. Moreover, even if the pins 9 are used as the connecting means, the pins 9 are not necessarily the "bundle pins" obtained by bundling the winding 31 around the pins 9, and instead of bundling the winding 31 around the pins 9, the winding 31 may be connected to the pins 9 by use of connection terminals. In this case, it is simply required to electrically connect only the pins 9 to the board 10 by, for example, soldering. Although the above-mentioned motor 1 is of the outer rotor type, the above-mentioned configuration may be applied to an inner rotor brushless motor in which the stator 3 is placed radially outward of the rotor 2, facing the rotor 2.

DESCRIPTION OF REFERENCE SIGNS

1 Motor (brushless motor)
2 Rotor
3 Stator
4 Shaft
4a One end surface
6 Holder
7 Cover
8 Small case plate
9 Pin (connecting means)
10 Board
11 Hall sensor
30 Stator core (core)
30a Core outer peripheral surface
31 Winding
60 Fixing portion
62 Mounting hole portion
62a Through-hole
64 Second boss (boss)
C Center line of shaft

The invention claimed is:

1. A brushless motor comprising:
a rotor configured to rotate integrally with a shaft;
a stator that is placed, facing the rotor in a radial direction, and includes a core around which a winding is wound;
a board that is placed, spaced away in an axial direction from one end surface of the shaft, and extends in a direction intersecting with the axial direction;
a holder that is fixed to the stator and configured to hold the board;
a connecting means configured to electrically connect the winding and the board; and
a Hall sensor configured to detect a rotational position of the rotor, wherein
the holder is sandwiched and fixed between a housing and a cover and includes a mounting hole portion in which the Hall sensor is mounted, the housing being formed in a bottomed cylindrical shape that covers the rotor from the radially outer side, and the cover being mounted on the holder, and
the Hall sensor is inserted from an opening on the rotor side of the mounting hole portion.

2. The brushless motor according to claim 1, wherein the connecting means is electrically connected to the board in an outer peripheral portion of the board.

3. The brushless motor according to claim 2, wherein the connecting means is a pin fixed to the holder, and at least a part of the pin does not overlap with the core as viewed in the axial direction.

4. The brushless motor according to claim 1, wherein the mounting hole portion includes a through-hole penetrating the holder in the axial direction, and has a stepped shape in which an opening on the rotor side is larger than an opening on the board side.

5. The brushless motor according to claim 1, wherein the cover is mounted on the holder with the board placed between the cover and the holder.

6. The brushless motor according to claim 1, comprising a plate-shaped small case plate that is fixed to the stator and placed on one direction side relative to the core, the one direction being a direction of the board away from the one end surface, wherein
the holder includes a fixing portion fixed to the core side of the small case plate; and a boss protruding from the fixing portion toward the one direction side relative to the small case plate, and
the board extends in a direction orthogonal to the axial direction and is fixed by riveting the boss.

7. The brushless motor according to claim 1, wherein the brushless motor is of an outer rotor type in which the stator is placed radially inward of the rotor.

* * * * *